(12) United States Patent
Klein et al.

(10) Patent No.: US 7,006,434 B1
(45) Date of Patent: Feb. 28, 2006

(54) SYSTEM FOR NON-DISRUPTIVE INSERTION AND REMOVAL OF NODES IN AN ATM SONET RING

(75) Inventors: Edward Klein, Holliston, MA (US); Christopher J. White, N. Chelmsford, MA (US); Jeffrey Weiss, Lincoln, RI (US); Bappa Sinha, Brighton, MA (US)

(73) Assignee: CIENA Corporation, Linthicum, MD (US)

( * ) Notice: Subject to any disclaimer, the term of this patent is extended or adjusted under 35 U.S.C. 154(b) by 421 days.

(21) Appl. No.: 09/501,202

(22) Filed: Feb. 10, 2000

(51) Int. Cl.
*H04L 12/26* (2006.01)
(52) U.S. Cl. ...................... 370/223; 370/403
(58) Field of Classification Search ................ 370/216, 370/217, 218, 221, 222, 223, 224, 389, 392, 370/395.1, 398, 399, 396, 397
See application file for complete search history.

(56) References Cited

U.S. PATENT DOCUMENTS

| | | | | |
|---|---|---|---|---|
| 5,500,857 A | * | 3/1996 | Nakata | 370/440 |
| 6,278,690 B1 | * | 8/2001 | Herrmann et al. | 370/224 |
| 6,301,254 B1 | * | 10/2001 | Chan et al. | 370/397 |
| 6,366,556 B1 | * | 4/2002 | Ballintine et al. | 370/216 |
| 6,370,146 B1 | * | 4/2002 | Higgins et al. | 370/400 |
| 6,538,987 B1 | * | 3/2003 | Cedrone et al. | 370/216 |

* cited by examiner

*Primary Examiner*—Steven Nguyen
(74) *Attorney, Agent, or Firm*—Dougherty Clements; Christopher L. Bernard; Tyler S. Brown

(57) ABSTRACT

A system and a method of operating the system for non-disruptively inserting a node into the operations of an ATM ring uses the ring operations to update topology information and routing tables at the existing nodes to include therein the new node and one or more virtual paths associated with the new node. Basically, the node to be inserted establishes communications with a ring hub node over an established intra-ring management channel. The node and the ring hub node then exchange information over the management channel and the node performs its initializing routines in order that the node may operate to pass through traffic on the existing virtual paths. The new node next requests from the hub node the assignment of one or more virtual paths for directing traffic between that node and other nodes on the network. In response to the request, the hub node assigns one or more virtual paths to the requesting node and establishes a signaling channel to the node over one of the virtual paths. The hub node also notifies the other nodes of the assignment, and downloads to the new node routing tables that include the established connections over the existing virtual paths. The node may then participate in traffic shaping on existing virtual circuits, and also in call set up and call tear down operations over its assigned virtual paths in the same manner as the other nodes on the ring. A failed, or otherwise inoperative, node is removed from the ring without disrupting the traffic on the ring by essentially reversing the node insertion operations. After learning of the node failure, the hub node instructs the operative nodes to tear down the virtual path and associated virtual circuits that originate from or end at the failed node. Thereafter, the hub node directs the nodes to update their ring topology information to remove the failed node. In the meantime, the nodes continue to maintain the other virtual path and virtual circuit connections over the ring without disruption. When the failed node is later re-booted, the system follows the steps discussed above to re-insert the node, without disrupting the traffic on the ring.

26 Claims, 3 Drawing Sheets

SYSTEM FOR NON-DISRUPTIVE INSERTION AND REMOVAL OF NODES IN AN ATM SONET RING

FIELD OF INVENTION

The invention relates generally to asynchronous transfer mode (ATM) rings and, more particularly, to mechanisms for insertion and removal of ring nodes.

BACKGROUND OF THE INVENTION

Communication rings include a plurality of nodes that are interconnected by a communication medium, such as fiber optic cable. In known prior ATM rings, the traffic on the ring is disrupted when a node is inserted into the ring, that is, when the node is brought into the ring operations, and/or when a node is removed from the ring operations. In order for the newly inserted node to operate in the ring, the existing nodes must be configured to make use of the virtual paths associated with the new node. In one known ATM ring, the nodes on the ring must be re-configured individually and manually, that is, each must be reprogrammed. Accordingly, the traffic on the ring is disrupted as the operations of each of the respective ring nodes are interrupted so that the node can be updated to make use of the new virtual paths.

The traffic on the ring is also disrupted each time a ring node has a catastrophic failure and must be removed from the ring operations. When a node fails, the functioning ring nodes must again be reconfigured. In such systems, the traffic on the ring is also further disrupted when the failed node is re-booted and re-inserted into the operations of the ring. Ring traffic may also be disrupted when a node is temporarily removed from the ring for service or upgrading and thereafter re-booted and re-inserted.

The reconfiguration of the nodes in the prior system must be performed under the control of the system manager. Accordingly, the time to reconfigure each node, and thus, the time during which traffic on the ring is disrupted at each node, and collectively over the ring, is relatively long. Further, the time it takes to insert a node increases as the number of nodes on the ring increases.

As the rings become larger and more traffic is sent over them, the longer disruptions in the traffic are not as easily tolerated. This is particularly the case when the ring is shared by multiple customers, and any disruption adversely affects more than the customer that is, for example, joining the ring. Accordingly, what is needed is a system for inserting and removing a node without disrupting the traffic on the ATM ring.

SUMMARY OF THE INVENTION

The invention is a system and a method of operating the system for non-disruptively inserting a node into the operations of an ATM ring by first including the node as a virtual path pass through and then using the ring operations to update the routing tables at the new node and the existing nodes to include therein the one or more virtual paths associated with the new node. The system non-disruptively removes a node from the ring essentially by reversing the insertion operations. The system and method are described below in terms of a SONET ring that handles ATM traffic, but may be used in any ATM ring.

Basically, the node to be inserted establishes communications with a ring hub node over an established intra-ring management channel. The node and the ring hub node then exchange information over the intra-ring management channel and later over a virtual path that is assigned to that node, to bring the new node into the ring operations in stages without disrupting the flow of ATM traffic over the existing virtual path connections. For ease of understanding, we refer hereinafter to the node that is inserted into the ring as the "new node."

More specifically, once the new node is physically connected into the ring it operates as an optical bypass. The new node then performs its initializing routines and, as necessary, communicates with the hub node, to allow the traffic on the existing virtual paths to pass through the processor on the new node. The new node next requests that the hub node assign one or more virtual paths for directing traffic between the new node and the other nodes on the network, that is, between the new node and the other ring nodes and also the network nodes that are external to the ring. In response to the request, the hub node assigns the virtual path or paths to the new node and establishes a signaling channel to the node over one of the virtual paths. The hub node also notifies the other nodes of the assignment, and downloads to the new node routing tables that include the established connections over the existing virtual paths.

The new node is thus brought fully up-to-date. Accordingly, it may participate in traffic shaping on existing virtual circuits, and in call set up and call tear down operations over its assigned virtual paths, as discussed in more detail below.

When a node fails, the system reverses the steps discussed above to remove the node from the ring without further disruption of the traffic on the ring. The hub node learns of the node failure when the failed node no longer communicates with the hub node, as discussed in more detail below. The hub node then instructs the operative nodes to tear down the virtual paths and associated virtual circuits that originate or end at the failed node. The nodes continue to maintain the other virtual path and virtual circuit connections over the ring, and the ATM traffic that is directed to the operative nodes is thus not disrupted. When the failed node is later re-booted, it is brought back into the ring operations without disrupting the traffic on the ring using the steps discussed above.

The operations of the current system are in contrast to known prior systems in which the insertion of a new node and/or the failure and re-insertion of a previously operative node requires system-operator controlled reconfiguration of the nodes on the ring.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
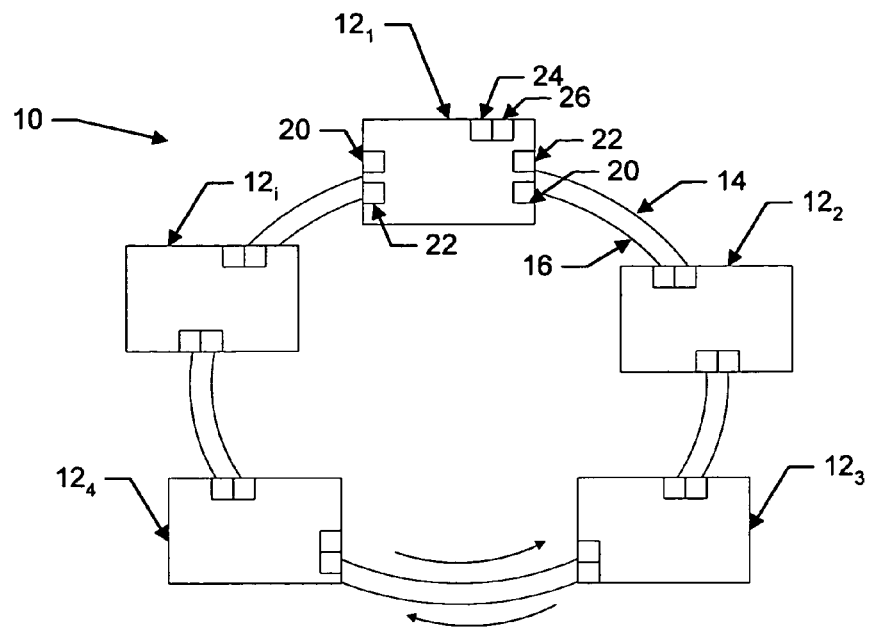
FIG. 1 is a functional block diagram of a system constructed in accordance with the invention.

Referring now to FIG. 1, a system 10 that may be part of an ATM network includes a plurality of nodes $12_1, 12_2, \ldots$ $12_i$ that are referred to collectively as nodes 12. One of the nodes, for example, node $12_1$, operates as a ring hub node to control ring operations.

The nodes 12 are interconnected by a primary ring 14 and a secondary ring 16. The exemplary system 10 is a unidirectional SONET ring, with information in the form of ATM cells and frames transmitted in both directions over the primary and secondary rings. The system 10 may, however, be any type of ATM ring. We discuss below how a new node is non-disruptively inserted into the ring and how a failed node is non-disruptively removed from the ring. First, however, we discuss in general the operations of the system 10.

1. Ring Operations in General

Each node 12 receives information over the rings 14 and 16 through incoming ports 20 and sends information over the rings through destination ports 22. The nodes 12 also connect to other systems (not shown), including other networks or rings, or to various user terminals, through other incoming and destination ports 24 and 26.

The ATM cells are sent over the rings from source nodes to destination nodes in virtual circuits. The system groups the virtual circuits into virtual paths that include other virtual circuits with the same source and destination nodes.

Each virtual path is identified by a virtual path index (VPI), and each virtual circuit is similarly identified by a virtual circuit index (VCI). The VPI and VCI values are included in ATM cell headers, and are used by successive nodes to determine how to route the cells.

Intermediate nodes manage the cells on a virtual path basis. When an intermediate node receives cells over a virtual path on the primary ring, the node forwards the cells to succeeding nodes on the primary ring over the same virtual path. The intermediate node may, however, use the virtual circuit information for traffic shaping in the virtual path, in a conventional manner. Similarly, when an intermediate node receives cells over a virtual path on the secondary ring the node forwards the cells to succeeding nodes on the secondary ring over the same virtual path, and uses the virtual circuit information for traffic shaping.

Each destination node maintains routing tables (not shown) that reference at least the associated virtual circuits over both the primary and secondary rings and the destination ports to which the virtual circuits are directed. The destination nodes select one ring interface, based on the quality of the traffic received over both rings, and direct the traffic from the selected interface to the appropriate ports.

The nodes 12 exchange ring management information with the hub node $12_1$ over a dedicated intra-ring management channel. In particular, the hub node $12_1$ and the other ring nodes 12 exchange ring topology information over the intra-ring management channel. In the exemplary system 10, the topology information includes updates to virtual path and virtual circuit routing tables (not shown) that are maintained at each of the nodes, and also information relating to the responsiveness or non-responsiveness of the various nodes. The ring nodes 12 also provide to the hub node $12_1$ certain other information concerning the integrity of the primary and secondary rings by, for example, periodically sending OAM cells to the hub node over the intra-ring management channel.

2. Ring Operations for the Insertion of a Node

Figure 2:
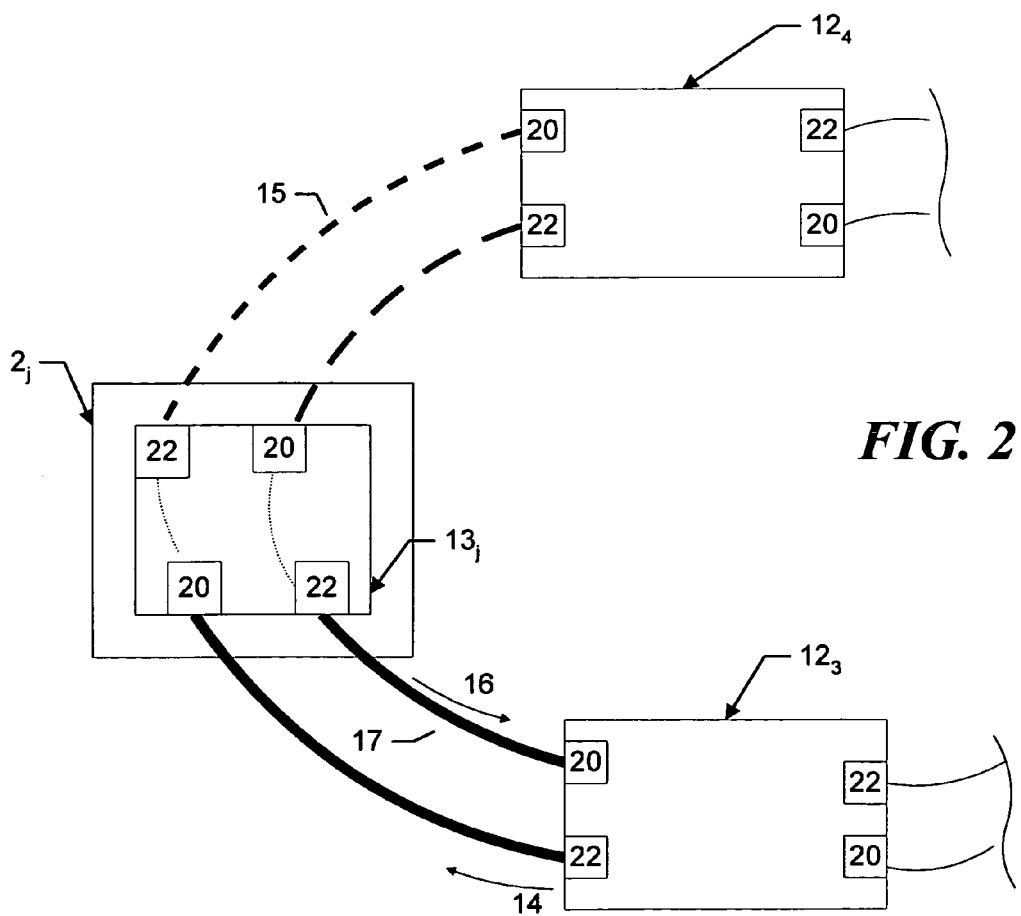
FIG. 2 is the system of FIG. 1 with an additional ring node.

Referring now also to FIG. 2, before a new node $12_j$ is inserted into the system 10, that is, before the node participates in ring operations, the cabling and the node hardware are installed in a conventional manner. Accordingly, to install a new node $12_j$ between, for example, the nodes $12_3$ and $12_4$, the cabling 15 for the primary ring 14 and the cabling 17 for the secondary ring 16 that connect nodes $12_3$ and $12_4$ are unplugged from the ports 20 and 22 of the node $12_4$. While the cabling is unplugged, the traffic between the nodes $12_3$ and $12_4$ is re-routed around the ring. The unplugged cabling is then plugged into the appropriate incoming and destination ports of the new node $12_j$ and additional cabling is run between the new node and the node $12_4$. Electrical connections for the two rings are thus made through the connection hardware $13_j$ of the new node $12_j$. The added cabling is depicted in the drawing by dotted lines.

Figure 3:
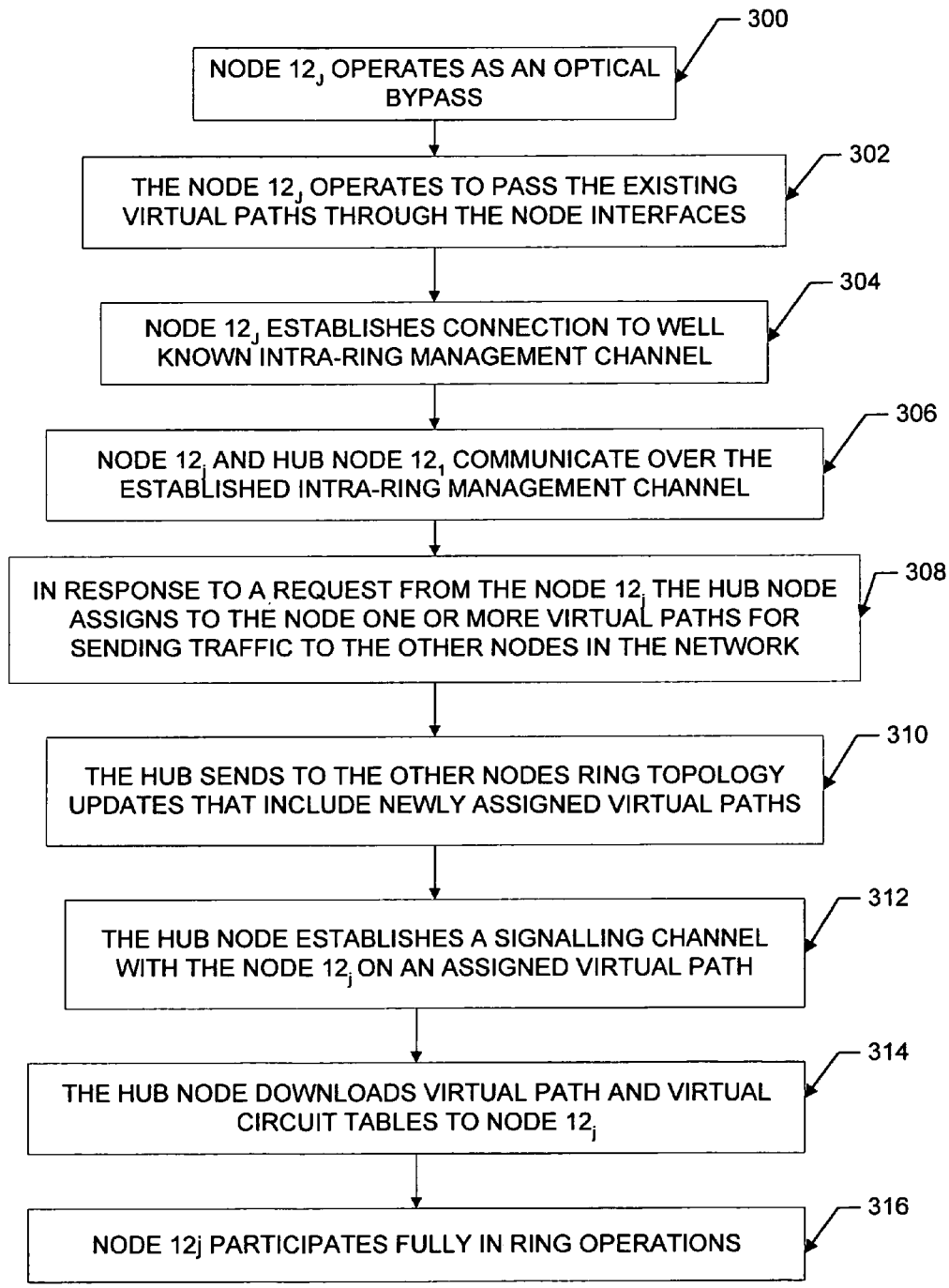
FIG. 3 is a flow chart of the operations of the system of FIGS. 1 and 2 to insert a node.

Referring as well to FIG. 3, once the cabling is in place, the new node $12_j$ operates as an optical bypass, to physically pass ring traffic between the nodes $12_3$ and $12_4$ (step 300). The new node $12_j$ must then be inserted into the ring operations, so that users connected to the ring through the node $12_j$ can send and receive information over the ring.

The new node $12_j$ performs its initialization routines, places all virtual paths in pass through mode, and communicates with the hub node $12_1$ over the intra-ring management channel to exchange information that allows a node processor in the new node $12_j$ to control traffic passing through the new node. In particular, the hub node and the new node $12_j$ exchange information that allows the node processor to process the ATM traffic on the existing assigned virtual paths through the ports $20_j$ and $22_j$ (steps 302, 304, 306). In the example, the new node contains a list of a default range of virtual paths from which all of the virtual paths on the ring are assigned, and the new node essentially configures itself, without hub node control, to operate as a virtual path pass through. If the new node did not contain such a list, the hub node would instead provide a list of the assigned virtual paths.

The new node $12_j$ next sends a request to the hub node $12_1$ over the intra-ring management channel, asking the hub node to assign to the new node one or more virtual paths. The new node will later use these virtual paths to establish connections over virtual circuits to the other nodes in the system, both on and external to the ring (step 308). With the new node requesting its virtual path assignment, the hub node is freed from monitoring the passive activities of this node and the other new nodes that are being brought into the ring operations. Accordingly, the hub node may instead manage the dynamic operations on the ring, such as call set up and tear down.

In response to the request from the new node, the hub node assigns one or more virtual paths to the node. The hub node may then notify the other nodes of the new assignment (step 310). Alternatively, if the path assignment is within the default range, the hub node may instead update the topology information to include the new node and rely on call set up operations to update the routing tables when connections are established over the newly assigned virtual paths, as discussed below. The ring nodes 12 may instead learn of the new node through cells that are periodically introduced to test ring continuity and/or to verify ring topology.

The hub node next establishes a signaling channel over one of the virtual paths assigned to the new node. The hub node and the new node can then exchange call set up and tear down information over the signaling channel (step 312). The hub node next downloads to the new node $12_j$ over the management channel a set of up-to-date routing tables that include all of the existing virtual path assignments and/or the associated virtual circuit connections (step 314). The routing tables are preferably the tables discussed in co-pending U.S. patent application Ser. No. 09/344,845 entitled RAPID CALL ESTABLISHMENT IN ATM RINGS which is assigned to a common assignee and is incorporated herein by reference. In the exemplary system, the hub node also downloads an error checking code, such as a check sum, that is used by the new node $12_j$ to verify that the routing tables were downloaded without error.

The node $12_j$ may now fully participate in the ring operations. More specifically, the node $12_j$ sends over the established signaling channel requests to the hub node $12_1$ to set up calls from associated users as virtual circuits over a newly assigned virtual path, and later to tear down inactive connections over the assigned virtual path. This call set up and tear down information is also sent by the hub node to the other nodes on the ring, and these nodes then update their routing tables to include the connections. Based on instructions and update information received by the new node at various times from the hub node, the node $12_j$ updates its routing tables as new connections are established between the various other ring nodes, and as various connections are torn down. Also, the new node uses the virtual circuit information in the routing tables to shape traffic over the various virtual paths in a conventional manner.

3. Ring Operations for Removal of a Failed Node

Figure 4:
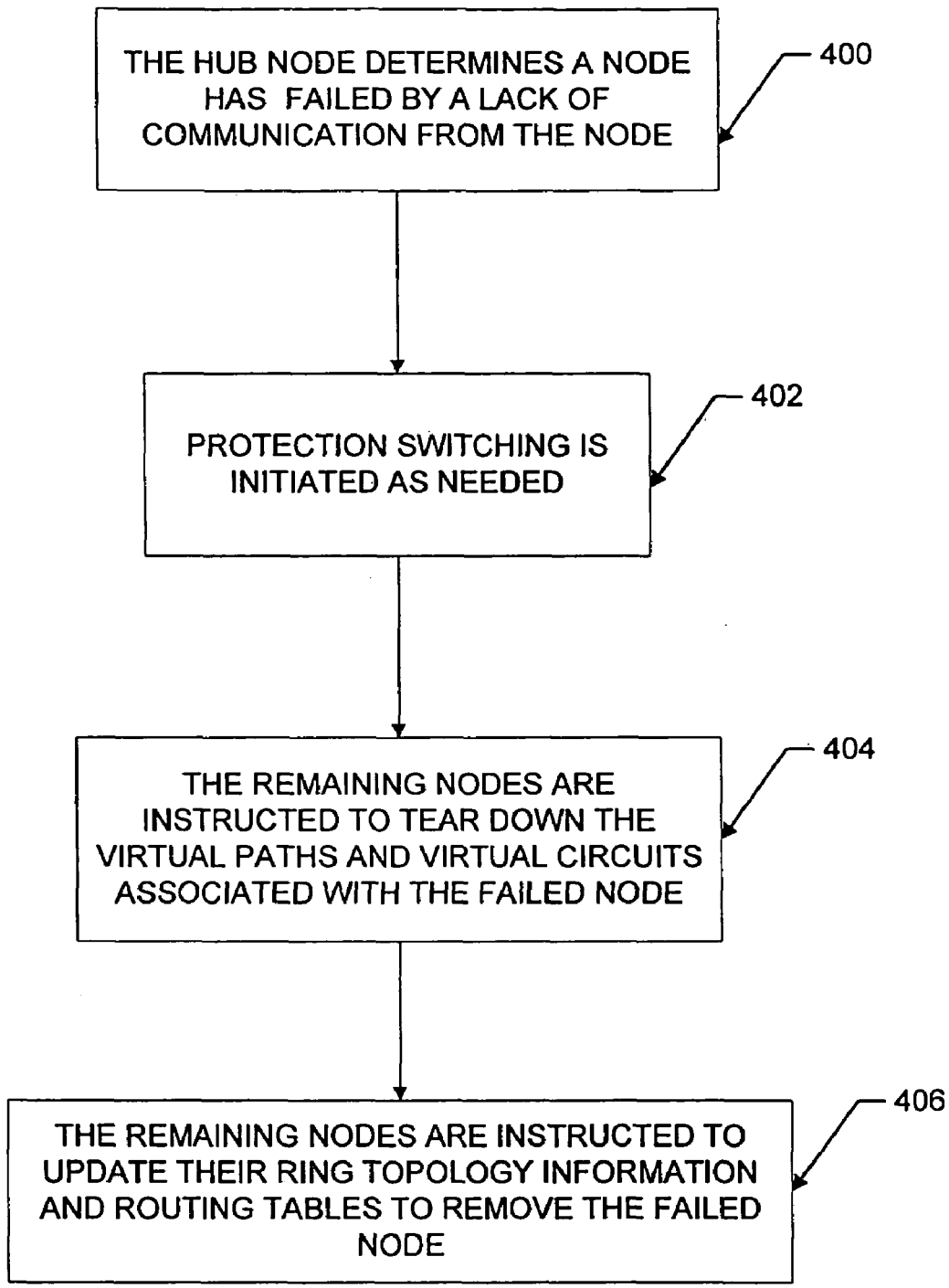
FIG. 4 is a flowchart of the operations of the system of FIGS. 1 and 2 to removing a node.

Referring now to FIG. 4, when a node 12 fails, the system 10 removes the failed node from the ring operations, without disrupting the operations of the remaining ring nodes, essentially by reversing the steps for the insertion of a node. The hub node learns of the failure of, for example, node $12_3$, when the node $12_3$ stops communicating with the hub node over the signaling channel established between them. The hub node may also learn of the failure of the node $12_3$ when the hub node does not, during a predetermined maximum time interval, receive OAM cells or other cells that are periodically originated by the node $12_3$. Alternatively, the hub node may learn of the failure when the node does not respond appropriately to the OAM cells or other test cells that the hub node originates and sends over the ring to test ring continuity and/or to verify ring topology (step 400).

Once the hub node has determined that the node $12_3$ has failed, the hub node instructs the other nodes on the ring to, as necessary, re-route traffic through the operative nodes as part of a protection switching operation (step 402). If the electrical connections, that is, the cables and associated hardware, through the failed node are functional, the failed node $12_3$ operates by default as an optical by-pass and the ring traffic need not be re-routed.

The hub next instructs the operative ring nodes to tear down the virtual circuits that originate from or are directed to the failed node (step 404). In response, the nodes update their routing tables. The hub node then sends updated ring topology information to the remaining nodes, and instructs them to remove from their routing tables the virtual paths associated with the failed node. At the same time, the remaining ring nodes 12 continue to send and receive ATM traffic associated with the operative ring nodes over the ring in the usual manner, that is, over the existing virtual paths and associated virtual circuits.

When the failed node 12 is later replaced or re-booted, the new or newly operative node is inserted into the ring operations in accordance with the steps discussed above with reference to FIG. 3, and the traffic over the ring is not disrupted. The same node insertion operations may also be followed after a node has been taken temporarily out of ring operations for upgrading and/or service.

The system and method of operating the system described above allow ring traffic to travel the ring without disruption while nodes are added or failed nodes are removed from the ring. This is in contrast to the operations of known prior ATM rings that require the nodes to be individually reconfigured under the control of a system manager, in order to add or remove a node from ring operations.

The foregoing description has been limited to a specific embodiment of this invention. It will be apparent, however, that variations and modifications may be made to the invention, such as, for example, use of any type of communication media between nodes, configuration of the ring as any type of dual-path communication network, with the attainment of some or all of its advantages. Therefore, it is the object of the appended claims to cover all such variations and modifications as come within the true spirit and scope of the invention.

What is claimed is:

1. A method for inserting a given node into ring operations of an ATM ring, including:
   operating the given node as a bypass for ATM traffic on the ring;
   operating the given node as a pass through for the ATM traffic on other existing virtual path connections on the ring before a virtual path is established for the given node;
   assigning to the given node one or more virtual paths to direct traffic to and from the given node over the ring;
   communicating the virtual path assignment to other nodes on the ring to establish the assigned virtual path on the ring; and
   providing to the given node connection information for virtual paths and virtual circuits on the ring.

2. The method of claim 1 wherein the step of providing connection information to the given node includes providing routing tables to the given node.

3. The method of claim 2 wherein the step of providing connection information further includes providing the information from a hub node to the given node.

4. The method of claim 3 wherein the step of providing connection information further includes:
   providing an error checking code with the information, and
   at the given node checking the information with the error checking code to determine that the information is correct.

5. The method of claim 1 wherein the step of assigning the virtual path to the given node further include
   the given node requesting the assignment from a hub node, and
   the hub node responding to the request with the assignment.

6. The method of claim 1 wherein the step of communicating the virtual path assignment to other nodes includes updating routing tables maintained by the other nodes.

7. The method of claim 1 wherein the step of communicating the virtual path assignment to other nodes includes providing to the other nodes call set up information for calls over the newly assigned virtual path.

8. The method of claim 1 further including the steps of
   establishing connections to and from the given node over the assigned virtual path; and
   tearing down connections over the assigned virtual path.

9. The method of claim 8 wherein the step of communicating the virtual path assignment to other nodes includes updating routing tables maintained by the other nodes.

10. The method of claim 9 further including updating the routing tables with call set up and tear down information associated with the one or more virtual paths assigned to the given node.

11. The method of claim 1 further including the step of, at the given node, shaping traffic over the virtual circuits associated with the established connections on the ring.

12. The method of claim 1, further including:
establishing a connection for the given node with an intra-ring management channel; and
exchanging pass through information between the given node and a hub node on the ring via the intra-ring management channel, the pass through information being used to operate the given node as a pass through.

13. A method for inserting a given node into ring operations of an ATM ring and removing a failed node from the ring operations, the method including:
operating the given node as a bypass for ATM traffic on the ring;
operating the given node as a pass through for the ATM traffic on existing connections on the ring before a virtual path is established for the given node;
assigning to the given node one or more virtual paths to direct traffic to and from the given node over the ring;
communicating the virtual path assignment to other nodes on the ring to establish the assigned virtual path on the ring; and
providing to the given node connection information for virtual paths and virtual circuits on the ring;
tearing down connections directed to and initiating from a failed node; and
instructing non-failing nodes on the ring to update ring topology information.

14. The method of claim 13 wherein the step of providing connection information to the given nodes includes providing routing tables to the given node.

15. The method of claim 14 wherein the step of providing connection information further includes providing the information from a hub node to the given node.

16. The method of claim 14 wherein the step of providing connection information further includes
providing a error checking node with the information, and
at the given node checking the information with the error checking code to determine that the information is correct.

17. The method of claim 13 wherein the step of assigning the virtual path to the give node further includes
requesting, at the given node, the assignment from a hub node, and
responding to the request, at the hub node, with the assignment.

18. The method of claim 13 wherein the step of communicating the virtual path assignment to other nodes includes updating routing tables maintained by the other nodes.

19. The method of claim 13, further including:
detecting a failure with respect to the failed node in response to the failed node failing to communicate with a hub node.

20. The method of claim 13, wherein said connections includes at least one of virtual paths and virtual circuit connections initiating from or destined to the failed node.

21. A ring network for conducting asynchronous transfer mode (ATM) communications, comprising:
a plurality of ring nodes operably connected via a plurality of virtual paths, each virtual path being used to direct traffic from an initiating ring node to a destination ring node; and
a ring hub node configured to instruct a newly-inserted ring node to operate as a pass through from ATM traffic via the virtual paths until one or more new virtual paths are established for the newly-inserted ring node.

22. The ring network of claim 21, wherein the ring hub node is further configured to assign the new virtual paths to direct traffic to and from the newly-inserted ring node.

23. The ring network of claim 21, wherein the ring hub node is further configured to provide connection information to the ring nodes, the connection information corresponding to virtual paths and virtual circuits on the ring network.

24. The ring network of claim 21, wherein the ring hub node is further configured to
detect a failure of one of the ring nodes; and
tear down, in response to the detected failure, connections on the ring network directed to or initiating from the failed ring node.

25. The ring network of claim 24, wherein the ring hub node is configured to detect the failure in response to the failed ring node failing to communicate with the ring hub node.

26. The ring network of claim 21, wherein the ring hub node is further configured to provide instructions to the non-failing ring nodes to update ring topology information at the non-failing ring nodes, the updated topology information indicating that the failed ring node is removed from the ring network.

* * * * *